United States Patent
Le Palud et al.

(10) Patent No.: US 11,533,942 B2
(45) Date of Patent: Dec. 27, 2022

(54) METHOD FOR PRODUCING A READY-TO-USE, LONG-LIFE INFANT MILK

(71) Applicant: EVEN SANTE INDUSTRIE, Lesneven (FR)

(72) Inventors: Jean-Marc Le Palud, Plabennec (FR); Anne Ranc, Treflaouenan (FR); Anne Fosseux, Brest (FR)

(73) Assignee: EVEN SANTE INDUSTRIE, Lesneven (FR)

( * ) Notice: Subject to any disclaimer, the term of this patent is extended or adjusted under 35 U.S.C. 154(b) by 0 days.

(21) Appl. No.: 15/514,782

(22) PCT Filed: Oct. 7, 2015

(86) PCT No.: PCT/HR2015/052688
§ 371 (c)(1),
(2) Date: Mar. 27, 2017

(87) PCT Pub. No.: WO2016/059321
PCT Pub. Date: Apr. 21, 2016

(65) Prior Publication Data
US 2017/0215467 A1    Aug. 3, 2017

(30) Foreign Application Priority Data

Oct. 13, 2014 (FR) ..................... 1459786
Aug. 7, 2015 (FR) ..................... 1557616

(51) Int. Cl.
*A23L 33/00* (2016.01)
*A23C 9/152* (2006.01)
(Continued)

(52) U.S. Cl.
CPC ............ *A23L 33/40* (2016.08); *A23C 9/1315* (2013.01); *A23C 9/158* (2013.01); *A23C 9/1522* (2013.01);
(Continued)

(58) Field of Classification Search
CPC ..... A23L 33/40; A23C 9/1315; A23C 9/1522; A23C 9/158; A23C 9/20
See application file for complete search history.

(56) References Cited

U.S. PATENT DOCUMENTS

| 5,429,837 A | 7/1995 | Balabaud et al. |
| 2007/0243290 A1 | 10/2007 | Thompson et al. |

(Continued)

FOREIGN PATENT DOCUMENTS

| FR | 2699370 A1 | 6/1994 |
| WO | 97/35488 | 10/1997 |

OTHER PUBLICATIONS

Durand et al. "Particle sizes and stability of UHT bovine, cereal and grain milks", Food Hydrocolloids 17 (2003) 671-678; Retrieved from Internet URL <https://www.sciencedirect.com/science/article/pii/S0268005X03000122>. (Year: 2003).*
(Continued)

*Primary Examiner* — Stephanie A Cox
(74) *Attorney, Agent, or Firm* — Arrigo, Lee, Guttman & Mouta-Bellum LLP

(57) ABSTRACT

The invention relates to a method for producing a milk food made as a substitute for breast milk, in the form of a ready-to-use, long-life liquid. The invention also relates to the facility for implementing said method and to the milk food made as a substitute for breast milk produced by said method.

14 Claims, 1 Drawing Sheet

(51) Int. Cl.
*A23C 9/20* (2006.01)
*A23C 11/04* (2006.01)
*A23C 9/158* (2006.01)
*A23C 9/13* (2006.01)

(52) U.S. Cl.
CPC ............... *A23C 9/20* (2013.01); *A23C 11/04* (2013.01); *A23V 2002/00* (2013.01); *A23V 2250/0612* (2013.01); *A23V 2250/0644* (2013.01); *A23V 2250/154* (2013.01); *A23V 2250/156* (2013.01); *A23V 2250/18* (2013.01); *A23V 2250/304* (2013.01); *A23V 2250/5116* (2013.01); *A23V 2250/54252* (2013.01); *A23V 2250/612* (2013.01); *A23V 2250/641* (2013.01); *A23V 2250/70* (2013.01)

(56) References Cited

U.S. PATENT DOCUMENTS

| | | | | |
|---|---|---|---|---|
| 2008/0255247 | A1* | 10/2008 | Sagalowicz | A61K 8/06 514/772 |
| 2012/0177708 | A1* | 7/2012 | Leser | A23D 7/0053 424/401 |
| 2013/0071446 | A1* | 3/2013 | Van Der Beek | A23D 7/011 424/400 |

OTHER PUBLICATIONS

International Search Report of PCT/FR2015/052688, dated Jan. 18, 2016.

* cited by examiner

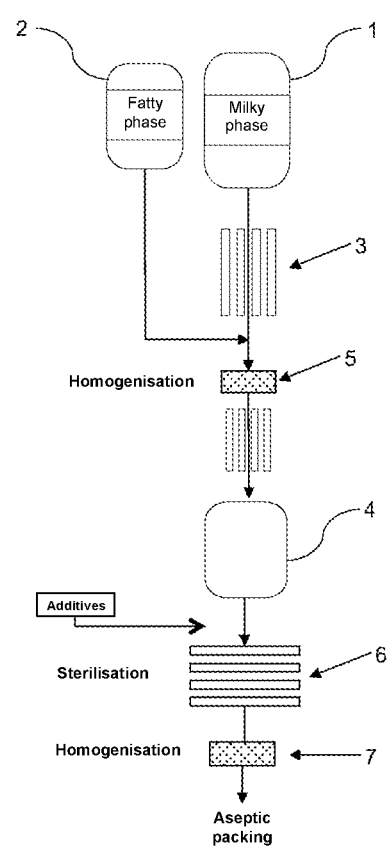

METHOD FOR PRODUCING A READY-TO-USE, LONG-LIFE INFANT MILK

FIELD OF THE INVENTION

The present invention relates to the field of preparing liquid milk foods for infants from cow's milk or milk from other mammals, for ready-to-use formulas with a long shelf-life, typically exceeding 90 days.

STATE OF THE ART

Various different dairy products for infants in addition to their manufacturing process are known from the prior art.

These dairy products are designed as partial or complete substitutes for breast milk. These foods are required to fulfil particular formulation constraints owing to the population for which they are intended.

Powdered infant formula milks are in widespread use. However, ready-to-use liquid milk foods are tending to develop. The latter are obtained via complex processes in order to fulfil the specific characteristics in terms of composition of these products. These milk foods are generally kept at room temperature after sterilisation.

Known from European patent EP2465359 is an improved nutritional composition, especially for infants, comprising particular fat particles.

This patent relates to a method of manufacturing a dairy product or nutritional formula, such as an infant formula, which has a fat particle distribution which resembles human breast milk. The process comprises mixing vegetable fats, protein and carbohydrates in a high-shear rotor stator mixer and subsequently subjecting said mixture to homogenisation so as to provide a composition with a monomodal fat particle size distribution and a low proportion of fat particles below 1 μm. Further aspects of the invention relates to the dairy product or nutritional formula per se and the use of said dairy product or nutritional formula.

Patent FR2699370 relates to a method of manufacturing a long-life, antiregurgitation infant milk that involves:

preheating and subsequently homogenising an infant milk, subsequently treating this milk at ultra-high temperature (UHT), finally, packing the milk under an aseptic atmosphere in sterile packaging, characterised in that before the homogenisation stage, 0.3 to 1% of a thickening agent chosen from the group comprising locust bean, guar, carrageenans and pectins, alone or as a mixture thereof, calculated based on the weight of the packed sterile milk, is added to the milk. The invention also relates to the, particularly liquid, infant milk thus obtained.

Disadvantages of the Prior Art

The solutions proposed in the prior art are unsatisfactory, as they do not make it possible to achieve adequate stability to ensure a long shelf-life. The methods known from the prior art result in compositions comprising compounds that tend to quickly settle, which does not make it possible to offer long-life, ready-to-use products.

Solution Provided by the Invention

In order to address these drawbacks, the present invention relates to a method allowing preparation of ready-to-use, high-stability liquid foods. To this end, the invention relates in its broadest sense to a method for preparing a long-life, ready-to-use milk food made as a substitute for breast milk in liquid form, comprising the following stages:

preparation in two separate tanks of a first phase consisting of a milk composition and a second fatty phase transfer of said first phase from the first tank to a balance tank, via a duct comprising a route of injection of said second phase, wherein said duct comprises homogenisation means between the injection zone of the second phase and the balance tank in order to form a pre-emulsion cooling of said pre-emulsion in the balance tank and holding at a temperature of between 5 and 10° C. for a period of between 3 and 30 H treatment of said preparation by sterilisation and by a second homogenisation packing of the preparation thus obtained in an aseptic environment.

Long-life means a product that can be stored for at least 90 days. This storage complies with the accepted regulatory definition of the Best Before Date (BBD) in the sense of article R112-9, subparagraph 5 of the French Consumer Code. The product can preferably be stored for at least 6 months.

The dual homogenisation makes it possible to obtain fat droplets of a few tenths of a micrometre. The second high-pressure homogenisation increases the stability of the preparation. In one embodiment, the second high-pressure homogenisation takes place after sterilisation and before packing. It is understood that this second homogenisation can also take place before sterilisation.

According to a first embodiment, cooling of said pre-emulsion in the balance tank and holding at a temperature of between 5 and 10° C. lasts between 8 and 30 H.

According to a second embodiment, cooling of said pre-emulsion in the balance tank and holding at a temperature of between 5 and 10° C. lasts between 3 and 15 H. This cooling time allows better keeping of the product over time.

Advantageously, the process furthermore comprises incorporation of food additives. In one embodiment, this incorporation is performed in the pre-emulsion.

Advantageously, sterilisation is performed at a temperature of between 120 and 160° C.

Advantageously, the first homogenisation pressure is between 200 and 1500 bars and the first homogenisation temperature is between 60 and 90° C.

Advantageously, the second homogenisation pressure is between 400 and 1500 bars and the second homogenisation temperature is between 60 and 90° C.

The invention also relates to the food compositions obtained using this method and ensuring a long shelf-life.

Advantageously, the invention concerns a long-life, ready-to-use milk food made as a substitute for breast milk in liquid form obtained via a preparation method according to the method previously described.

The milk food made as a substitute for breast milk complies with currently applicable legislation and includes the nutrients necessary and appropriate for infant development, such as carbohydrates, fats, proteins, minerals and vitamins.

According to one embodiment, the milk food made as a substitute for breast milk comprises milk proteins, an energy density of between 50 and 100 kcal/100 mL and a calcium/phosphorus ratio greater than 1; it contains calcium provided by the milk proteins and calcium provided by calcium mineral forms according to an insoluble/soluble form ratio greater than or equal to 45%/55% in weight of said calcium mineral forms.

Preferentially, this insoluble/soluble form ratio is between 55%/45% and 100%/0% in weight of the calcium mineral formed added in addition to the milk.

The preferential contribution of calcium in insoluble form restricts interactions with the proteins, thereby providing the milk food made as a substitute for breast milk better stability.

It is understood that the calcium is provided by two sources: a dairy source and an exogenous source in order to balance the calcium concentration of the milk-based food. This exogenous source is provided by insoluble and solution calcium mineral forms. The insoluble forms may, non-restrictively, be calcium phosphate, calcium carbonate, calcium hydroxide or a mixture thereof, or of their derivatives. The soluble forms may be calcium chloride or calcium lactate or a mixture thereof, or of their derivatives.

This same milk-based food contains minerals other than calcium, provided by the dairy source and/or by exogenous sources. The total exogenous mineral contributions, i.e. all the minerals provided except for proteins and calcium included, occur in insoluble and soluble forms according to an insoluble/soluble form ratio preferably less than or equal to 45%/55% in weight of said exogenous mineral forms. Contribution preferably in soluble form of the total exogenous minerals improves stability of the milk-based food over time and allows better homogeneity of the food.

The milk proteins are total milk proteins and therefore comprise caseins and serum proteins. These milk proteins are provided by a preferentially liquid dairy source, such as milk, skimmed milk or ultrafiltration retentate. The milk proteins may nevertheless be supplied in powder form by milk protein isolates, milk protein concentrates and/or milk protein hydrolysates. An addition source of serum proteins is preferably provided in powder form, for example by whey, serum protein isolates, serum protein hydrolysates and/or serum protein concentrates.

The addition of serum proteins modifies the casein/serum protein ratio such that the amino acid profile of the milk food made as a substitute for breast milk is as close as possible to natural breast milk. Advantageously, the milk food made as a substitute for breast milk comprises serum proteins according to a casein/serum protein ratio between 35:65 and 65:35, wherein the milk-based food comprises between 1 and 4 g of proteins per 100 mL of food.

According to another specific embodiment, the milk-based food comprised demineralised whey.

The whey may be provided in demineralised or even highly demineralised form, wherein the mineral contribution is made by supplementation in order to better control the quantity of different minerals required for infant feeding. This makes it possible to obtain an infant food perfectly standardised in terms of mineral profile, the composition of which is closely similar to natural breast milk.

Advantageously, the milk food made as a substitute for breast milk comprises animal fats and vegetable fats, wherein the animal fats comprise fats of dairy origin, with said fats of dairy origin representing between 10 and 25% in weight of the total fat.

The vegetable fats are non-limitatively selected from among rapeseed, sunflower, palm, algal, microalgal and mushroom oils or a mixture thereof.

The animal fats are selected between fish oil and dairy fats or a mixture thereof.

The milk food made as a substitute for breast milk also comprises emulsifying agents suitable for oil-water emulsions. They are preferable selected from among fatty acid esters, mono- and di-glycerides of fatty acids or furthermore lecithins. The emulsifying agents selected are to preferably have a hydrophilic-lipophilic balance of between 8 and 20 against the HLB frame of reference.

The lactose incorporated in the milk food made as a substitute for breast milk is preferentially provided by an entirely water-soluble lactose.

In a specific embodiment that makes it possible to obtain an antiregurgitation milk-based food, the milk-based food contains thickening agents. These thickening agents are selected from among the carrageenans, locust bean gums, other gums, pectins and celluoses or any other thickening agent or mixture of at least two from this list capable of being included in a dairy food composition for infants. These thickening agents may also be selected between agar-agar and/or starch.

The milk food made as a substitute for breast milk is packed in beverage boxes, bottles or any other packaging. Preferentially, the milk-based food is packed in a ready-to-use, single-dose bottle.

The invention furthermore relates to an installation for preparation of a milk-based food of this kind. In this respect, the invention relates to an installation for preparation of a long-life, ready-to-use milk food made as a substitute for breast milk in liquid form, comprising two first upstream tanks and a balance tank connected to a first upstream tank by a main duct comprising an injection zone for the contents of the second upstream tank, wherein said main tank furthermore comprises a homogeniser between the injection zone and the balance tank, wherein the installation furthermore comprises cooling means for cooling the balance tank, sterilisation equipment, a second high-pressure homogeniser and a sterile packaging line.

The sterilisation equipment can be positioned upstream or downstream from the second homogeniser. In one embodiment, the sterilisation equipment is positioned upstream from the second homogeniser.

In a first alternative solution, the invention comprises means of controlling the flow rate and temperature of the flow between the first upstream tank and the balance tank on the one hand and the flow between the second upstream tank and the balance tank on the other hand.

In a second alternative solution, the invention comprises means of controlling the pressure and temperature of the flow between the first upstream tank and the balance tank on the one hand and the flow between the second upstream tank and the balance tank on the other hand.

DESCRIPTION

The invention will be better understood in the light of the description of non-restrictive examples of embodiment.

FIG. 1 shows a diagram of the method according to the invention.

EXAMPLE 1: MANUFACTURE OF AN INFANT MILK ACCORDING TO THE INVENTION

The example below describes the invention for a batch of 5000 kg.

In a first tank (1), 1256 kg of skimmed milk is mixed with 3166 kg of water, 77.3 kg of powdered proteins and lactose equal to an amount of 227 kg and other additives in order to form a milky phase. These additives in the example described consist of a mixture of minerals and fibres. Table 1 gives the formula of the milky phase. This milky phase undergoes pasteurisation in appropriate equipment, such as a plate exchanger-type pasteuriser (3), well known to the person skilled in the art, at 77° C. for less than one minute.

In a second tank (2), 14.5 kg of an emulsifier and the mono- & di-glycerides of fatty acids are mixed with 157 kg of edible vegetable oils in order to form a fatty phase.

The milky phase in the first tank (1) is transferred to a second balance tank (4). During this transfer, the fatty phase is injected into the feeding pipe conveying the milky phase to the balance tank (4) in order to obtain a pre-emulsion. This injection is performed on line, for example using an on-line blender or at a homogeniser (5) at a temperature of 77° C. and at a pressure of 200 bars. This stage represents an initial homogenisation of the composition.

The pre-emulsion is subsequently allowed to stand in the balance tank (4) for a period of between 8 to 30 h.

Following this stage, additives are incorporated in the composition, such as, non-restrictively, vitamins of a quality and in a quantity compliant with European legislation for infant milks.

The composition is subsequently sterilised (6) according to the methods well known to the person skilled in the art, at a temperature of at least 134° C. for 50 seconds. The composition is immediately cooled to a temperature of approx. 80° C. and subsequently undergoes a second homogenisation stage in a high-pressure homogeniser (7), at a pressure of 500 bars and at a temperature of 80° C.

The sterile, homogenised composition is subsequently packed into 90 mL single-dose bottles, ready to use.

The composition of the infant milk in this non-restrictive embodiment is summarised in table 1.

TABLE 1-continued

Composition of an infant milk according to the invention

|  | kg/5000 kg |
|---|---|
| Vitamins | 2.6 |
| Nucleotides | 0.31 |

EXAMPLE 2: EXAMPLES OF FORMULATIONS FOR DIFFERENT INFANT MILK AGES ACCORDING TO THE INVENTION

Infant milks for four different ages were formulated and obtained using the method according to the invention:
a premature milk for premature infants, born beyond the 37th week of pregnancy
an initial milk for infants of between 0 and 6 months of age (example 1)
a follow-up milk for infants of between 6 and 12 months of age
a growth milk for babies of between 1 and 3 years of age These infant foods are liquid and ready-to-drink and are stable at room temperature according to a BBD of 12 months. These foods contain proteins supplied by total milk proteins and serum proteins.

These infant foods are manufactured according to the method in example 1 according to the invention with resting phase of the pre-emulsion in the balance tank of between 3 and 15 h. Table 2 below summarises the nutritional profiles of these infant milks:

TABLE 2

Nutritional profile of four exemplary embodiments of the invention.

|  | Unit | premature milk Per 100 ml | initial milk Per 100 ml | follow-up milk Per 100 ml | growth milk Per 100 ml |
|---|---|---|---|---|---|
| Energy | kcal | 80 | 65 | 65 | 65 |
|  | kJ | 335 | 273 | 273 | 273 |
| Proteins | g | 2.7 | 1.5 | 2 | 2 |
| Casein/Serum protein ratio |  | 40/60 | 40/60 | 60/40 | 53/47 |
| Fats | g | 4.05 | 3.3 | 3.2 | 3.2 |
| Carbohydrates | g | 8.2 | 7.1 | 7 | 7 |
| Lactose | g | 6.6 | 7.1 | 7 | 7 |
| Fibres | g | may be added | | | |
| Choline/Inositol/Carnitine/Taurine | mg | may be added, in compliance with European legislation and international standards as well as according to the ESPGHAN recommendations for premature milks | | | |
| Vitamins | µgR E | added, in compliance with European legislation and international standards as well as according to the ESPGHAN recommendations for premature milks | | | |
| Nucleotides | mg | may be added, in compliance with European legislation and international standards as well as according to the ESPGHAN recommendations for premature milks | | | |
| Minerals and trace elements | mg | added in compliance with European legislation and international standards as well as according to the ESPGHAN recommendations for premature milks | | | |

TABLE 1

Composition of an infant milk according to the invention

|  | kg/5000 kg |
|---|---|
| Water | 3166 |
| Skimmed milk | 1256 |
| Lactose | 227 |
| Mixture of vegetable oils | 157 |
| Soluble fibres | 87 |
| Serum proteins | 77.3 |
| Emulsifier | 14.5 |
| Minerals | 7.2 |
| Taurine-Choline-Carnitine-Inositol | 5 |

The initial milk in table 2 corresponds to the nutritional profile for 100 mL of exemplary embodiment 1.

The mineral and vitamin profile of these foods is adapted depending on the infant's age. For premature infants and infants of up to 6 months of age, this profile is complete, such that the milks can be used as the single source of nourishment. The milks for premature infants are formulated according to the tolerances defined by the regulations concerning Dietary Foods Intended for Special Medical Purposes and according to the recommendations of the ESPGHAN (European Society for Paediatric Gastroenterology Hepatology and Nutrition). The initial milks and follow-up milks are likewise formulated according to European legislation and international standards concerning infant milks.

In the case of follow-up milk and growth milk, the profile is adapted to diversification of the babies' diets.

These milks can be enriched with DHA (docosahexaenoic acid) and ARA (arachidonic acid) in accordance with European legislation and international standards concerning infant milks.

Stability Tests on the Infant Milk in Example 1
(Initial Milk)

Stability of the initial infant milk (example 1) was monitored over time and was verified using two tests. The first test comprised an observation over time of the products under normal storage conditions (room temperature of 20° C.) and non-optimal storage conditions (room temperature of 30° C.). The second test involved an analysis of physical stability of the infant milks according to the invention using an accelerated method.

Observation test: A portion of the bottles of infant milk previously obtained was divided into two batches of twelve bottles. One batch of bottles was placed at a room temperature of 20° C. and the other at a room temperature of 30° C. The bottles were controlled every month. The appearance of the product contained in the bottles was checked, mainly colour, creaming and the deposit at the bottom of the bottles.

Using the methods and formulations of the prior art, the infant foods display creaming and a deposit thicker than 2 mm after three months.

The infant food prepared according to the invention and particularly by means of dual homogenisation, the second homogenisation of which is performed at high pressure, makes it possible to avoid these problems. Indeed, after 6 months, no creaming was observed in the bottles at 20° C. and likewise at 30° C. A slight deposit of 1 to 2 mm depending on the bottles was observed. The observations performed on both batches are listed in table 3. The infant milks still did not display any creaming after 12 months, in addition to very slight deposits, fulfilling the regulatory criteria for a very long BBD.

TABLE 3

Observation of keeping qualities of the infant milk over time in bottles stored at 20° C. or 30° C.

| Time after manufacture | Observations at 20° C. | Observations at 30° C. |
| --- | --- | --- |
| D + 3 days | Clear colour, homogeneous, good | |
| D + 2 months | No creaming, 1 mm deposit | No creaming, no deposit |
| D + 4 months | No creaming, 1 mm deposit | No creaming, 1 mm to 2 mm deposit |
| D + 6 months | No creaming, 1 mm to 2 mm deposit | No creaming, 1 mm to 2 mm deposit |
| D + 12 months | No creaming, 1 mm deposit | No creaming, 1 mm deposit |

Analysis of physical stability using an accelerated method
This analysis involves accelerating the ageing process of the infant milks in order to qualify their keeping qualities over time. This test is based on the ability of the particles present in the infant milk, particularly fat, to separate according to their density. Optical density measurements are performed by transmission over time, in order to obtain two parameters, the instability index and the percentage sediment.

The stability index is a dimensionless number representing the change in percentage transmission of the sample between the beginning of centrifugation and at any time during centrifugation. The stability index 0% point is defined by the measurement of optical density transmission before the beginning of centrifugation.

The quantity of sediment is expressed as a percentage of the centrifuged volume.

The previously prepared infant milks were centrifuged at 4000 rpm at 30° C. for 2 h. The optical density over time was measured by transmission, before centrifugation and throughout centrifugation.

The infant milks showed an instability index of 0.3504 and a sedimentation percentage of 3.93%. By way of comparison, infant milks prepared without the high-pressure dual homogenisation displayed an instability index of 0.437 on average and a percentage sediment of 8.6% on average.

The infant milks prepared according to the invention therefore display better keeping qualities over time; they therefore keep better and longer, allowing a BBD of at least 6 months to be achieved.

Stability Tests on the Follow-Up and Growth Infant Milks

Stability of the follow-up and growth infant milks was monitored over time and was controlled by an observation over time of the products under normal storage conditions (room temperature of 20° C.) and non-optimal storage conditions (room temperature of 30° C.).

A portion of the bottles of follow-up and growth infant milk prepared according to the invention was divided into two batches of twelve bottles. One batch of bottles was placed at a room temperature of 20° C. and the other at a room temperature of 30° C. The bottles were controlled every month. The appearance of the product contained in the bottles was checked, mainly colour, creaming and the deposit at the bottom of the bottles.

Using the methods and formulations of the prior art, the infant foods display creaming and a deposit thicker than 2 mm after three months.

The infant milks prepared according to the invention and particularly by means of dual homogenisation, the second homogenisation of which is performed at high pressure, makes it possible to avoid these problems.

For the follow-up milk, at 20° C., no creaming was observed for up to at least 15 months of storage. The odour and colour had not changed. At 30° C., slight creaming was observed in addition to a slight change in colour.

For the growth milk, at 20° C., a few spots of cream were observed at 6 and 9 months. At 30° C., the milk did not display any creaming, even after 12 months. The other organoleptic parameters were substantially constant at 20° C. and 30° C.

The invention claimed is:
1. Method for preparing a long-life, ready-to-use milk food made as a substitute for breast milk in liquid form, comprising the following stages:
preparation in two separate tanks of a first phase consisting of a milk composition in a first tank and a second fatty phase in a second tank
transfer of said first phase from the first tank to a balance tank, via a duct comprising a route of injection of said second phase, wherein said duct comprises homogeni- sation means between an injection zone of the second phase into the first phase and the balance tank in order to form a pre-emulsion cooling of said pre-emulsion in the balance tank and holding at a temperature of between 5 and 10° C. for a period of between 3 and 30 H treatment of said cooled pre-emulsion by sterilisation and by a second homogenisation which is performed at high pressure between 500 and 1500 bars to generate a milk food packing of the milk food made as a substitute for breast milk thus obtained in an aseptic environment, wherein the milk food displays no creaming after three months at 20° C.

2. Process according to claim 1, characterised in that cooling of said pre-emulsion in the balance tank and holding at a temperature of between 5 and 10° C. lasts between 8 and 30 H.

3. Process according to claim 1, characterised in that cooling of said pre-emulsion in the balance tank and holding at a temperature of between 5 and 10° C. lasts between 3 and 15 H.

4. Process according to claim 1, further comprising incorporation of food additives in the pre-emulsion.

5. Process according to claim 1, characterised in that sterilisation is performed at a temperature of between 120 and 160° C.

6. Process according to claim 1, characterised in that the pressure of the first homogenisation is between 200 and 1500 bars and that the temperature of the first homogenisation is between 60 and 90° C.

7. Process according to claim 1, characterised in that the pressure of the second homogenisation is between 500 and 1500 bars and that the temperature of the second homogenisation is between 60 and 90° C.

8. The method of claim 1, wherein the packed milk food breast milk substitute is an initial milk having a shelf-life of at least 12 months at 20° C. without creaming.

9. The method of claim 1, wherein the packed milk food breast milk substitute is a follow-up milk having a shelf-life of at least 15 months at 20° C. without creaming.

10. The method of claim 1, wherein the packed milk food breast milk substitute is a growth milk having a shelf-life of at least 12 months at 30° C. without creaming.

11. The method of claim 7, wherein the packed milk food breast milk substitute is an initial milk having a shelf-life of at least 12 months at 20° C. without creaming.

12. The method of claim 7, wherein the packed milk food breast milk substitute is a follow-up milk having a shelf-life of at least 15 months at 20° C. without creaming.

13. The method of claim 7, wherein the packed milk food breast milk substitute is a growth milk having a shelf-life of at least 12 months at 30° C. without creaming.

14. The method of claim 7, wherein the packed milk food breast milk substitute is an initial milk having a shelf-life of at least 12 months at 20° C. without creaming, wherein the obtained milk food is characterised in that it comprises animal fats and vegetable fats, wherein the animal fats comprise fats of dairy origin, with said fats of dairy origin representing between 10 and 25% in weight of the total fat.

* * * * *

UNITED STATES PATENT AND TRADEMARK OFFICE
CERTIFICATE OF CORRECTION

PATENT NO. : 11,533,942 B2  
APPLICATION NO. : 15/514782  
DATED : December 27, 2022  
INVENTOR(S) : Jean-Marc Le Palud et al.

Page 1 of 1

It is certified that error appears in the above-identified patent and that said Letters Patent is hereby corrected as shown below:

On the Title Page

Item (86):
Delete "PCT/HR2015/052688" and replace with "PCT/FR2015/052688"

Signed and Sealed this
Tenth Day of October, 2023

Katherine Kelly Vidal
*Director of the United States Patent and Trademark Office*